United States Patent [19]

Ozaki et al.

[11] Patent Number: 4,485,417
[45] Date of Patent: Nov. 27, 1984

[54] PCM RECORDING AND REPRODUCING DEVICE

[75] Inventors: Minoru Ozaki; Kunimaro Tanaka, both of Hyogo, Japan

[73] Assignee: Mitsubishi Denki Kabushiki Kaisha, Tokyo, Japan

[21] Appl. No.: 396,856

[22] Filed: Jul. 9, 1982

[30] Foreign Application Priority Data

Jul. 9, 1981 [JP] Japan .................... 56-108740
Jul. 9, 1981 [JP] Japan .................... 56-108741

[51] Int. Cl.³ .......................................... G11B 17/00
[52] U.S. Cl. ...................................... 360/73; 360/32
[58] Field of Search ........................... 360/73, 32, 26

[56] References Cited

U.S. PATENT DOCUMENTS

| 4,348,699 | 9/1982 | Tsuchiya et al. | 360/73 |
| 4,410,917 | 10/1983 | Newdoll et al. | 360/15 |
| 4,423,441 | 12/1983 | Ozaki et al. | 360/13 |
| 4,446,494 | 5/1984 | Stockham, Jr. et al. | 360/73 |

*Primary Examiner*—Vincent P. Canney
*Attorney, Agent, or Firm*—Staas & Halsey

[57] ABSTRACT

A PCM recording and reproducing device is improved by providing an apparatus for positively obtaining the reference phase reproduction signal by ANDing a plurality of synchronization marks from a plurality of tracks. In over-dubbing, portions to be recorded are delayed slightly so as to either lead or lag signals on previously recorded tracks.

12 Claims, 13 Drawing Figures

PCM RECORDING AND REPRODUCING DEVICE

BACKGROUND OF THE INVENTION

This invention relates to a multi-channel PCM recording and reproducing device of the stationary head type.

FIG. 1 shows the recording format for a multi-channel PCM recording and reproducing device. In FIG. 1, reference character 1 designates a magnetic tape; 2-1 through 2-8, data tracks where the data of one audio channel are recorded; and 5-1 and 5-2, redundant tracks where redundant signals such as parity codes for correcting errors in the audio data of the data tracks 2 are recorded.

FIG. 2 illustrates a method of adding the redundant tracks 5-1 and 5-2 mentioned above. In FIG. 2, reference characters $a_1$ through $a_8$ designate data signals recorded in the data tracks 2-1 through 2-8; $c_1$ and $c_2$, error correcting redundant signals recorded in the redundant tracks 5-1 and 5-2, respectively; and b, the bit length.

The redundant tracks 5-1 and 5-2 are formed as follows: The data signals $a_1$ through $a_8$, each having b bits, are taken out of positions adjacent to one another in the widthwise direction of the tape in the above-described data tracks 2-1 through 2-8. That is, the error correcting signals $c_1$ and $c_2$ are obtained from the "vertical" data signals of 8b total bits, and are recorded in the redundant tracks 5-1 and 5-2.

FIG. 3 shows a number of data as shown in FIG. 2, which are arranged in the tape running direction, and shows redundant signals also added in the tape running direction. In FIG. 3, reference character S designates synchronization marks; and $d_1$ through $d_{10}$, redundant signals added every 7b bits in the data tracks 2-1 through 2-8 and the redundant tracks 5-1 and 5-2.

The above-described redundant signals $d_1$ through $d_{10}$ are generally provided by a CRC code algorithm. The CRC code (data signal+redundant signal) thus formed is prefixed with the synchronization mark S. Hereinafter, a data string beginning with the synchronization mark S and ending with the redundant signal $d_i$ (where i=1 through 10) will be referred to as "a frame", when applicable. The frames for ten tracks form one code block CB.

One example of a conventional multi-track PCM recording and reproducing device for recording data in the above-described format is as shown in FIG. 4a. In FIG. 4a, reference numeral 1 designates a magnetic type which runs in the direction of the arrow D; 7, a multi-track playback head; 101, an amplifier for amplifying the output of the playback head 7; 201, a time axis correcting circuit for temporarily accumulating the output of the amplifier 101 and outputting it with crystal oscilator accuracy; 102, an error correcting circuit for correcting the output of the circuit 201; 103, a D/A (digital-to-analog) converter for subjecting the output of the circuit 102 to digital-to-analog conversion; 104, an audio amplifier for amplifying the output of the D/A converter 103, the above-described circuit elements 101, 201, 102, 103 and 104 together forming a playback digital circuit 9, which has an output terminal 8.

Further in FIG. 4a, reference numeral 11 designates an input terminal, and 106 is an audio amplifier for amplifying the audio signal from the input terminal 11, an A/D (analog-to-digital) converter 107 subjects the output of the audio amplifier 106 to analog-to-digital conversion, the circuit elements 106 and 107 together forming an input digital circuit 10. A switch 12 selects the output of either the error correcting circuit 102 on the playback side or the input circuit 10 on the record side. A delay circuit 105 is provided for compensating for the head interval, and operates to delay an input signal from the switch 12 for a predetermined period of time. An error correction code adding circuit 108 adds the synchronization mark S and the error correcting code $d_i$ (i=1 through 8) to the output of the delay circuit. A recording amplifier 109 amplifies the output of the error correction code adding circuit 108, the two circuit elements 108 and 109 together forming a recording digital circuit 15. A multi-track recording head 6 is provided for recording the output of the recording circuit 15 on the magnetic tape 1.

For simplification in description, FIG. 4a shows only the playback and record circuits for the data tracks. The arrangement for the redundant track is different from that of the data track described above. That is, the playback circuit thereof includes the circuits elements 7, 101, 201 and 102 only, and the output thereof is applied to all of the error correcting circuits for the data tracks. The recording signals of all of the data tracks are supplied to the recording circuits for the redundant tracks. Furthermore, during over-dubbing, the playback signals of the data tracks except for the recording tracks are supplied through the switches 12 of the tracks to the recording circuits of the redundant tracks. The playback circuits for the redundant tracks are different from those in FIG. 4a. Supplied to the error correcting circuit for each track are the playback data of the remaining tracks, for error correction.

Now, the operation of the circuitry shown in FIG. 4a will be described. The output of the playback head 7, after being amplified by the playback amplifier 101, is applied to the time axis correcting circuit 201. The playback data signal thus undergoes absorption of a time axis "jitter" attributable to the irregular running of the magnetic tape or the like, correction of a code error in the error correcting circuit 102, conversion into in analog signal in the D/A converter 103, and amplification in the audio amplifier 104. The data signal thus processed is delivered through the output terminal 8.

On the other hand, the audio signal applied to the input terminal 11 is amplified by the audio amplifier 106 and is then converted into a PCM signal by the A/D converter 107. The output of the A/D converter 107 is applied through the switch 12 to the delay circuit 105, where it is delayed for a predetermined period of time. The output thus processed is combined with the synchronization mark S and the redundant signal $d_i$(i=1 through 8) by the error correction code adding circuit 108, amplified by the recording amplifier 109, and recorded on the tape 1 with the recording head 6.

The switch 12 and the recording amplifier 109 are controlled by external operating buttons (not shown). When the switch 12 is connected to the output side of the error correcting circuit 102, the amplifier 109 is not operated.

One conventional multi-channel PCM recording and reproducing device is arranged as described above. With such a PCM recorder, jitter during playback can be absorbed using the time axis correcting circuit. This is one of the specific features of this PCM recorder.

FIG. 6 shows a recording format for the entire tape, illustrating a number of code blocks CB shown in FIG. 3.

With the above-described recording format, errors of two tracks with respect to the one code block can be corrected. Accordingly, even if a number of code errors occur because the recorded state of any one of the tracks is unsatisfactory, the errors can be sufficiently corrected. Furthermore, even if one track becomes completely inoperative and dropout takes place in other tracks, correction can be satisfactorily effected. Thus, the operation of the recorder is maintained satisfactory. That is, the stability of the recorder is remarkably improved.

Another multi-track PCM recording and reproducing device for realizing such a recording format is as shown in FIG. 4b.

In FIG. 4b, reference numeral 401 designates input terminals; 402, A/D (analog-to-digital) converters for converting analog signals from the input terminals 401 into PCM signals; 403, an error correction code adding circuit for adding error correction codes to the output signals of the A/D converters 402; 404, a synchronization mark adding circuit for adding synchronization marks to the outputs of the error correction code adding circuit 403; 405, a magnetic recording circuit for amplifying the output of the synchronization mark adding circuit 404; and 406, recording heads for recording the outputs of the magnetic recording circuit 405 on a magnetic tape 1.

Further in FIG. 4b, reference numeral 408 designates playback heads for reproducing the data on the magnetic tape 1; 409, reproducing circuit for amplifying the reproduction outputs of the playback heads 408; 410, a time axis correction circuit for temporarily storing the outputs of the reproducing circuit 409 and outputting them with crystal oscillator accuracy and for detecting synchronization marks; 411, an error correcting circuit for correcting errors in the output of the time axis correction circuit 410; 412, D/A (digital-to-analog) converters for converting the output of the error correcting circuit into an analog signal, the number of D/A converters being equal to the number of channels; and 413, the output terminals of the D/A converters 412.

Further in FIG. 4b, reference numeral 415 designates a clock generator circuit for providing a reference phase; 414, a phase comparator in which the reference phase provided by the clock generator circuit 415 and a reference reproduction phase obtained by detecting the synchronization marks in the time axis correction circuit are subjected to comparison; and 416, a capstan motor, the rotation of which is controlled by the output of the phase comparator 414.

The operation of the circuitry in FIG. 4b will now be described. Analog signals applied to the audio input terminals 401 are converted into PCM signals by the A/D converter 402, and are then applied to the error correction code adding circuit 403, where the error correcting redundant codes $c_1$, $c_2$ and $d_1$ through $d_{10}$ as shown in FIG. 3 are added to the signals. Furthermore, in the synchronization mark adding circuit 404, the synchronization marks S as shown in FIG. 3 are added to the signals. The signals thus treated are applied through the magnetic recording circuit 405 to the recording heads 406, so as to be recorded on the magnetic tape 1.

On the other hand, the data recorded on the magnetic tape 1 is reproduced by the playback heads 408. The data thus reproduced is applied through the reproducing circuit 409 to the time axis correction circuit 410. In the time axis correction circuit 410, the time axis jitter of the reproduced signals attributable to irregular running of the tape or the like is absorbed, and therefore the reproduced signals are output with crystal oscillator accuracy. The outputs of the time axis correction circuit 410 are subjected to error correction in the error correction circuit 411, and are converted into analog signals by the D/A converters 412. The analog signals are outputted through the audio output terminals 413.

The running of the tape is controlled by a phase control type servo system so that the time axis correction circuit 410 can correctly process data. That is, the "jittered" reference reproduction phase which is provided by the time axis correction circuit 410 is compared with the reference phase with crystal oscillator accuracy which is provided by the clock generator circuit 415, in the phase comparator 414. The detection output of the phase comparator 414 is used to control the rotation of the capstan motor 416, to thereby control the running of the tape.

In order for either of the above-described time axis correcting circuits to absorb jitter completely, tape transport must be controlled by a servo system of the phase control type according to phase comparison system in which the reference phase, whose accuracy is on the order of that of a crystal oscillator, is compared with the reference reproduction phase of the playback data signal. It is well known in the art that the detection data of the synchronization mark of any track shown in FIG. 3 is, in general, employable as the reference reproduction phase of the reproduced data signal mentioned above. However, if, in the case where a servo system which is controlled using the position of the synchronization mark of one track as a reference reproduction phase, and the track becomes unreproducable for some reason, the following difficulty takes place. Because of the lack of the synchronization mark, it is impossible to obtain the reference reproduction phase, and therefore the tape is run irregularly and accordingly the playback is irregular.

In addition to the tracks for recording PCM data, a servo track for recording only the reference reproduction phase may be provided; however, if the servo track becomes unreproducable, then it is impossible to correctly reproduce the PCM data. Thus, this method still involves a problem.

One of the functions of the multi-channel PCM recording and reproducing device is "over-dubbing". The term "overdubbing" means that, in synchronization with reproduced sounds from a track, and with a predetermined time delay, recording is effected for another track. However, over-dubbing causes the following problem.

In FIG. 4a, during over-dubbing for example, the audio data signal $a_2$ of a data track 2-2 is supplied through an input circuit 10 and a switch 12 of the track 2-2 to the recording circuits (not shown) of the redundant tracks 5-1 and 5-2, while the data signals $a_1$ and $a_3$ through $a_8$ of the remaining data tracks 2-1 and 2-3 through 2-8 are supplied through the playback circuits 9 and the switches 12 of the respective tracks and similarly to the recording circuits (not shown) of the redundant tracks 5-1 and 5-2, whereby the redundant signals $c_1$ and $c_2$ are formed by the recording circuits. In this case, if the data signals $a_1$ and $a_3$ through $a_8$ of the data tracks 2-1 and 2-3 through 2-8 are re-recorded, then deterioration due to code error is increased. Therefore, only those tracks which should be subjected to recording during over-dubbing and the redundant tracks 5-1 and 5-2 for which the redundant signals should be changed according to the recording should be subjected to re-recording.

FIG. 5 shows the changes of the data of the tracks due to the over-dubbing. In FIG. 5, shaded portions represent recorded areas, and reference character A designates one region on the tape 1.

FIG. 6 is an "enlarged" view of the region A in FIG. 5. In over-dubbing, in order for the redundant signals $c_1$ and $c_2$ to be formed, the data signals $a_1$ and $a_3$ through $a_8$ of the reproduction frames are reproduced with the playback heads 7, and the data signal $a_2$ of the second channel data and redundant signals $c_1$ and $c_2$ are recorded, that is, the frames except for the second channel are not recorded and the frame to be newly recorded should be correctly recorded as shown in FIG. 3. Accordingly, it is necessary that the signal to be recorded be delayed for a predetermined period of time, and the sum of this delay time and the signal processing time is exactly equal to the time required for the tape to run from the playback head 7 to the recording head 6. For this purpose, the PCM recording and reproducing device is provided with delay circuits 105. Thus, the delay circuits 105 ensure that the ten frames arranged vertically as shown in FIG. 6 form one code block.

However, if the time required for the tape to run from the playback head to the recording head becomes irregular because of jitter or the like, then the recording status of the tape subjected to over-dubbing involves position shifts $\Delta_1$, $\Delta_2$, $-\Delta_3$, $-\Delta_4$, $-\Delta_5$ and $\Delta_6$ as shown in FIG. 7(a), and the reference reproduction phase is irregular as shown in FIG. 7(b), thus making it impossible to correctly reproduce the data.

After over-dubbing has been carried out as shown in FIG. 7(a), the use of reference reproduction phase circuit in accordance with the present invention as shown in FIG. 8, in the reproduction of the tape can obtain a reference playback phase signal as shown in FIG. 7(b). (The reference reproduction phase circuit of FIG. 8 is a part of this invention, and is described in more detail later. Two aspects of the invention reside in this circuit and in the elongation of a delay time of a delay circuit. The following description is not intended to suggest drawbacks in the first aspect of the invention.)

In FIG. 8, reference numerals 611 through 618 designate synchronization mark detecting circuits; 621 through 628, one-shot multi-vibrators; 603, an AND gate; 415, a clock generating circuit; 414, a phase comparator; and 416, a capstan motor. The signal in part (b) of FIG. 7 corresponds to the output of the AND gate 603. The pulse signals B and C are produced in correspondence to the trailing edges of the synchronization marks. More specifically, the pulse signals B are produced in correspondence to the trailing edges of the playback synchronization marks of the tracks as recorded before, while the pulse signals C are produced in correspondence to the trailing edges of the playback synchronization marks of the tracks which are re-recorded during over-dubbing.

The position shifts between the tracks as described above are accumulated as over-dubbing is repeatedly carried out. Furthermore, as over-dubbing is repeated, the reference playback phase is adversely affected by jitter or the like, and the phase data thus affected are delivered to the playback servo system. As a result, the playback track frame and the record track frame become unstable in position, which makes it impossible to perform reconstruction of code blocks.

SUMMARY OF THE INVENTION

An object of this invention is to eliminate the above-described difficulties accompanying a conventional PCM recording and reproducing device.

More specifically, an object of the invention is to provide a PCM recording and reproducing device in which, in reproduction, the reference reproduction phase of the PCM reproduction data is provided by using the synchronization marks which are recorded in a plurality of tracks, so that the reference reproduction phase can be obtained positively.

A further object of the invention is to provide a PCM recording and reproducing device, in which a reference reproduction phase is formed by utilization of the synchronization marks of a plurality of tracks and, in over-dubbing, a signal is recorded at a position lagging or leading a playback track, whereby even in missing the synchronization mark of a track, playback can be carried out correctly and code blocks can be correctly reconstructed even under the effect of jitter or the like.

DETAILED DESCRIPTION OF THE PREFERRED EMBODIMENTS

Figure 1:
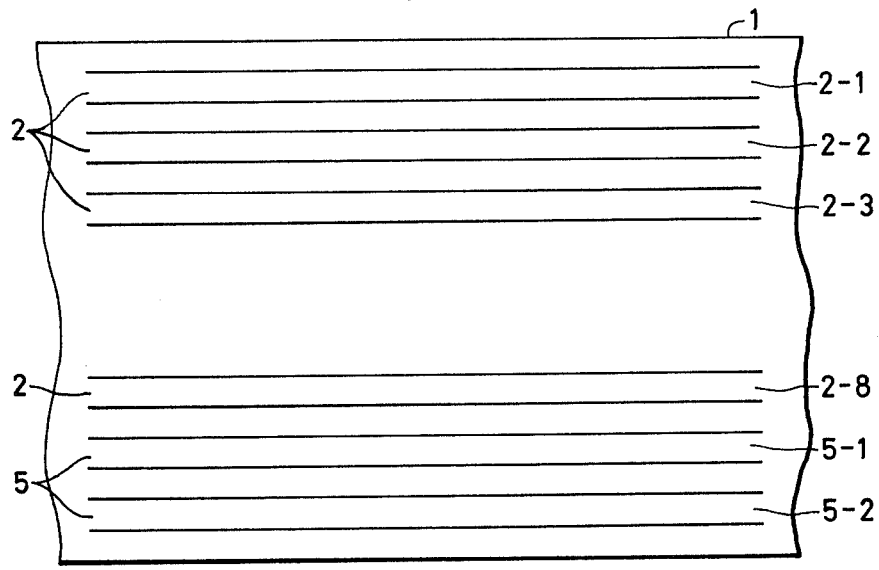
FIG. 1 is an explanatory diagram showing a recording format for a multi-track PCM recording and reproducing device.
Figure 2:
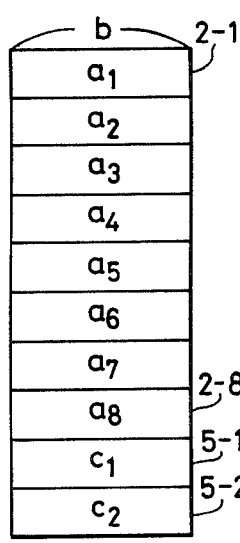
FIG. 2 is an explanatory diagram showing a method of adding redundant tracks.
Figure 3:
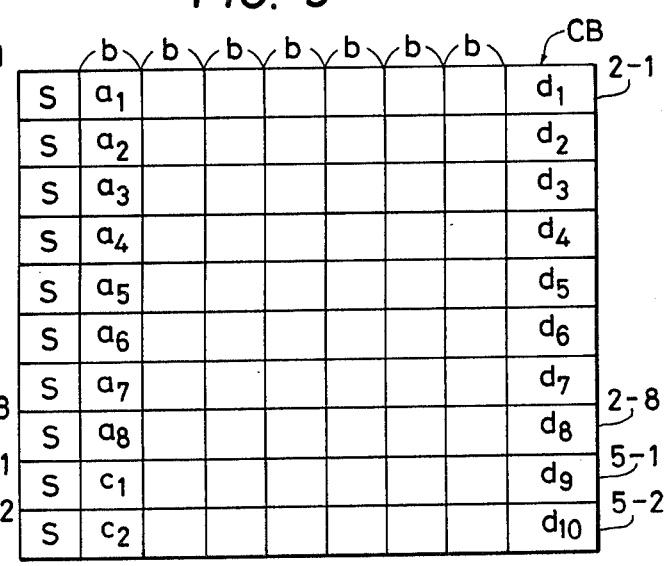
FIG. 3 is an explanatory diagram showing a code block.
Figure 4A:
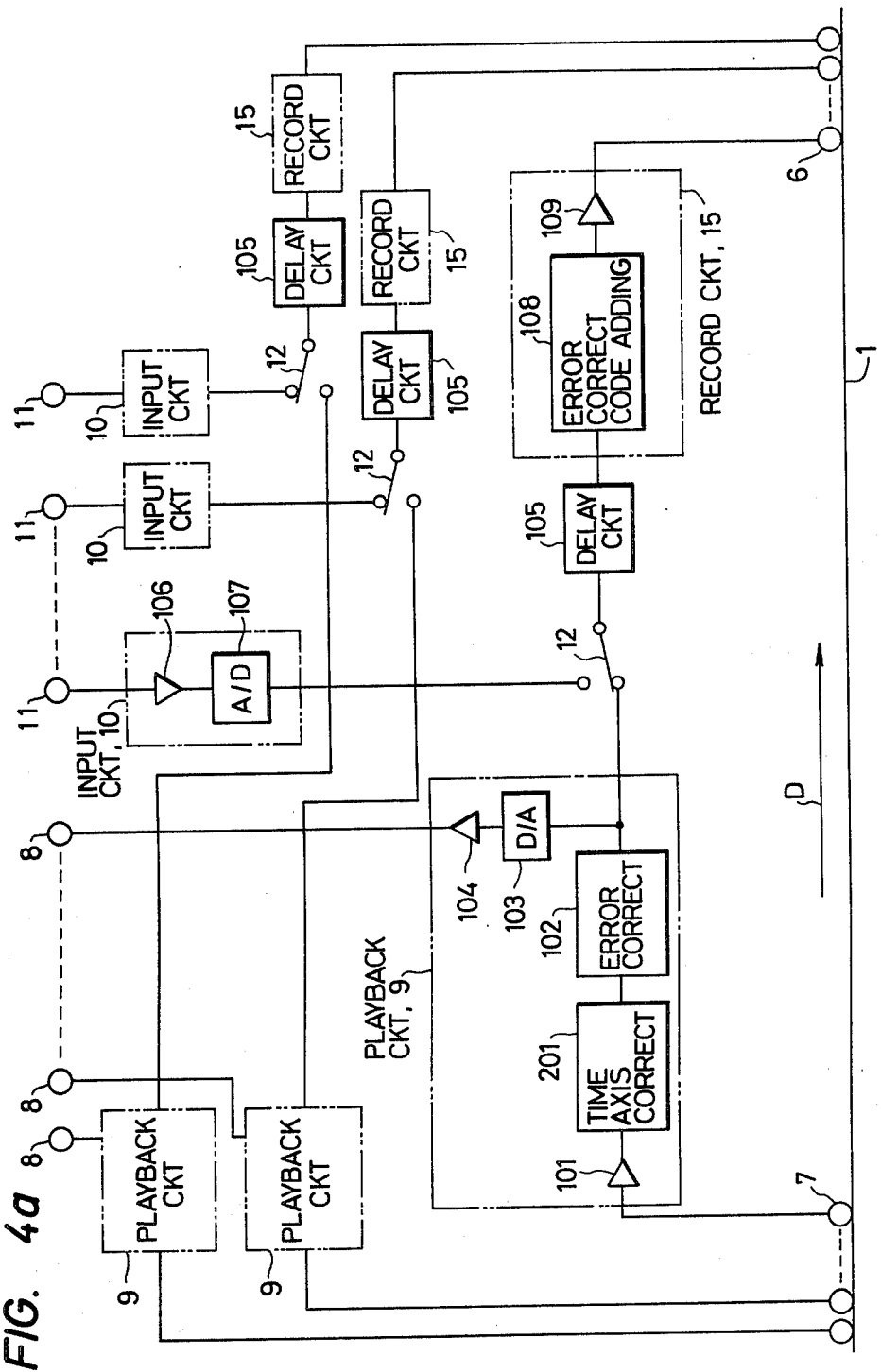
FIGS. 4a and 4b are block diagrams showing the arrangement of conventional multi-track PCM recording and reproducing devices.
Figure 4B:
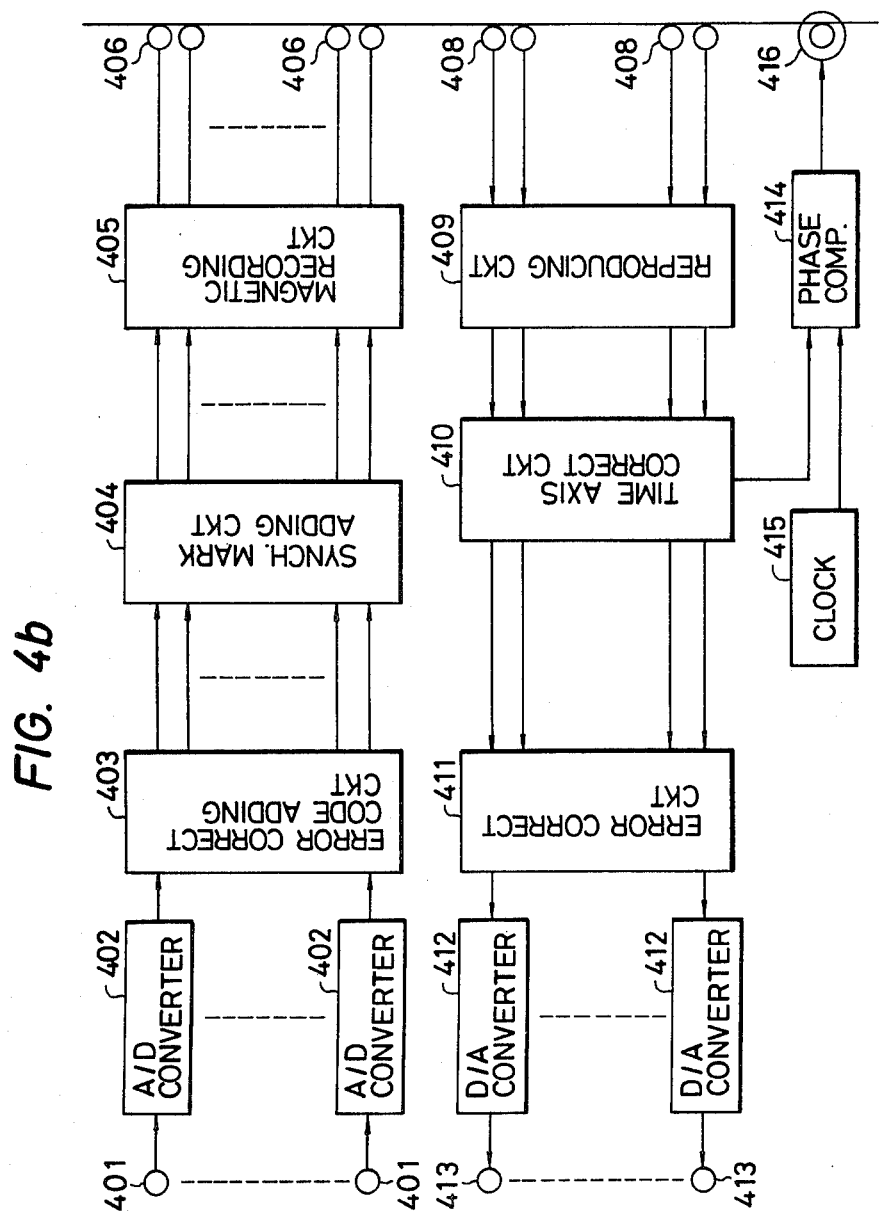
Figure 5:
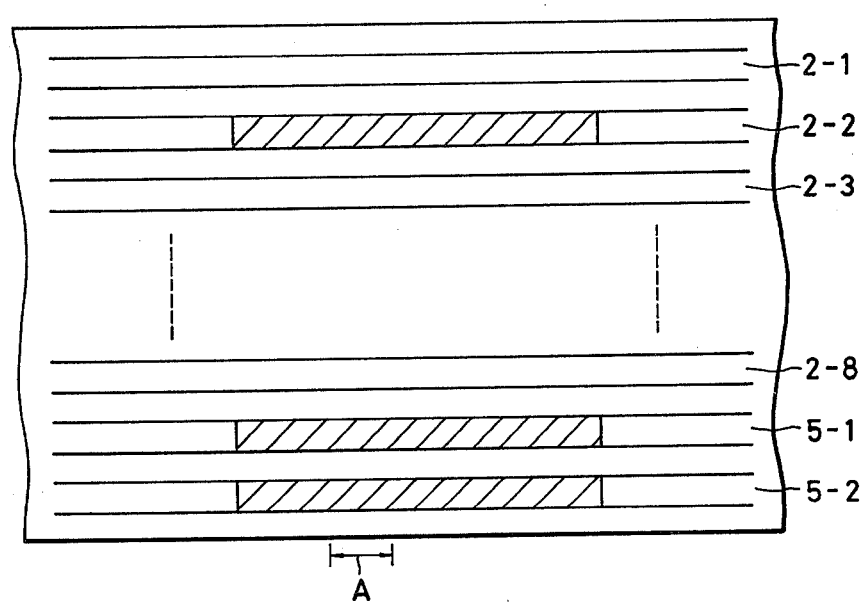
FIG. 5 is an explanatory diagram showing tracks in which the data are re-recorded by over-dubbing.
Figure 6:
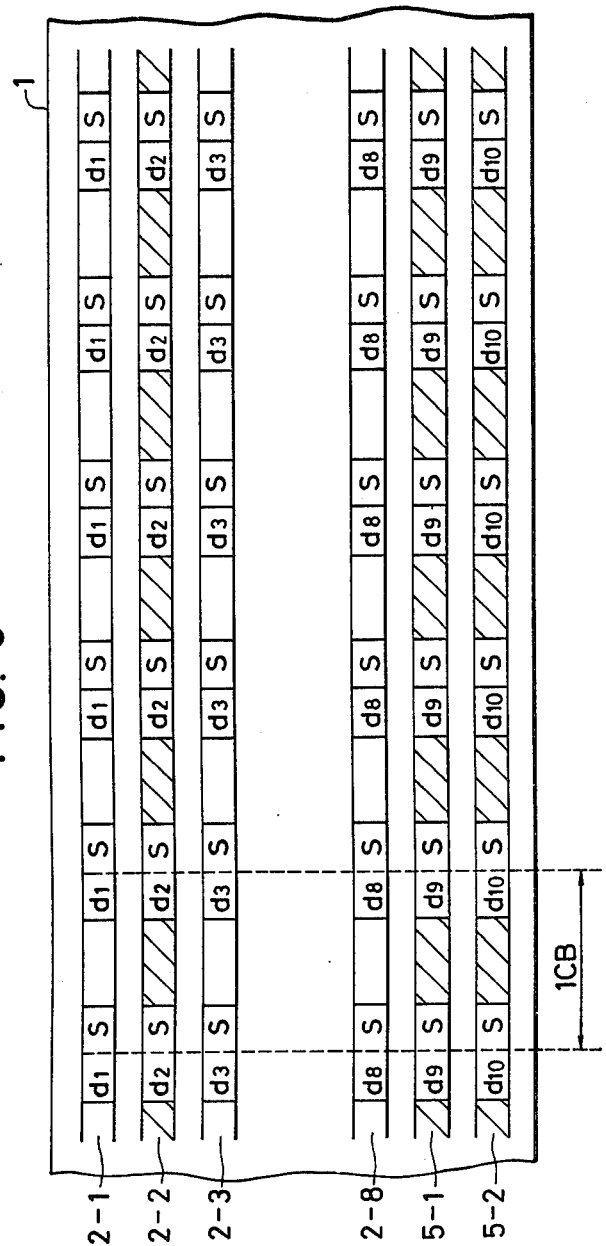
FIG. 6 is an explanatory diagram showing a tape section and the record format for a plurality of tracks.
Figures 7A, 7B:
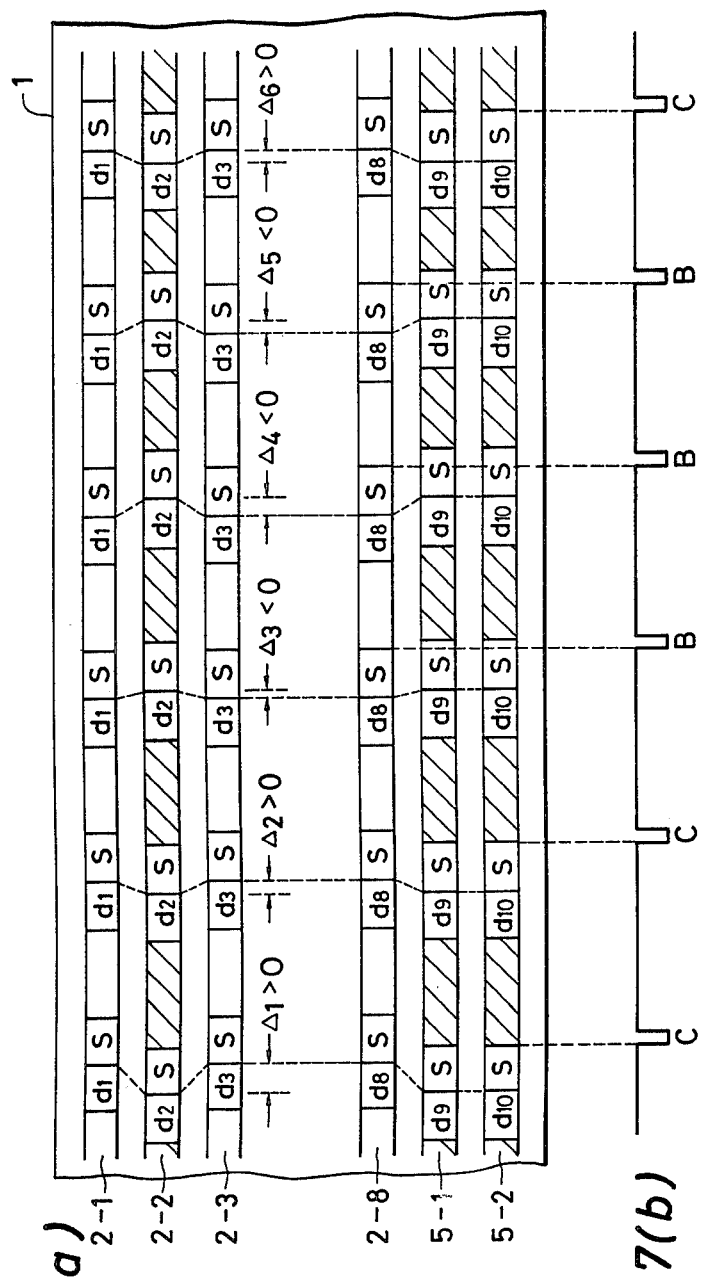
FIGS. 7(a) and 7(b) are explanatory diagrams showing positional shifts between tracks and the reference playback phase, after over-dubbing.
Figure 8:
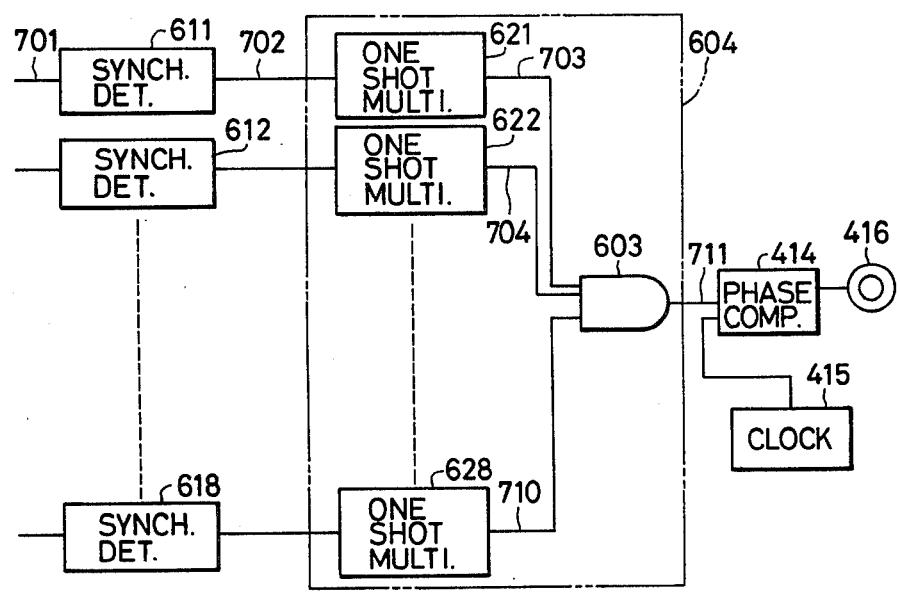
FIG. 8 is a block diagram showing a reference phase reproduction circuit according to one embodiment of this invention.

FIG. 8 is a block diagram showing a reference phase reproduction circuit in a PCM recording and reproducing device according to an embodiment of the invention. In FIG. 8, those circuit elements which have been described with reference to earlier Figures are therefore similarly numbered. In FIG. 8, reference numerals 611 through 618 designate synchronization mark detecting circuits in the time axis correction circuit 410 (FIG. 4b) or circuits 201 (FIG. 4a), the number of synchronization mark detecting circuits 611 through 618 being equal to the number of data tracks (which is eight (8) in this embodiment); 621 through 628, one-shot multi-vibrators for outputting "0" signals for a period of time which is half of the repetitive period of the synchronization marks, after the synchronization mark detecting circuits 611 through 618 have detected the synchronization marks; and 603, an AND gate for subjecting the outputs of the one-shot multivibrators to logical multiplication, the AND gate and the one-shot multivibrators forming a reference phase reproduction circuit 604. A clock generating circuit 415 provides a reference phase, the accuracy of which is equivalent to that of a crystal oscillator and a phase comparator 414 compares the phase of the output of the clock generating circuit 415 with the phase of the output of the AND gate 603. A capstan motor 416 is controlled by the output of the phase comparator 414.

In this invention, a delay time $T_d$ is set for the delay circuit 105 (FIG. 4a) as follows:

$$T_d = (d/v - T_p) + \Delta T_1 \quad (1)$$

where d (cm) is the head interval; v (cm/s) is the average tape speed; $T_p$ is the average signal processing time required between the playback head 7 and the recording head 6 except for the delay circuit 105; and $\Delta T_1$ is a predetermined time which is longer than the maximum value or effective value of the variation of the actual tape running time.

The parameter $\Delta T_1$ should satisfy the following expression:

$$\Delta T_1 \geq \tfrac{1}{2}(d\Delta/v)$$

where $d\Delta$ (cm) is the maximum value or effective value of the fluctuation between the frames in over-dubbing.

Figure 9:
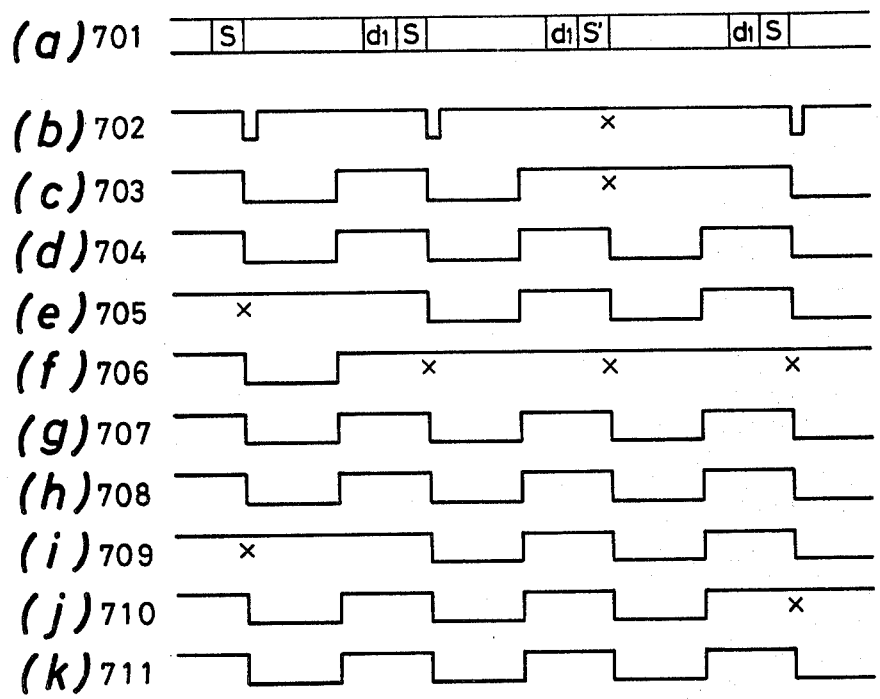
FIG. 9 is a time chart showing signal waveforms in the circuit of FIG. 8.

FIG. 9 is a time chart showing the waveforms of the signals on the signal lines of the circuitry according to this embodiment of the invention. In FIG. 9, reference numeral 701 designates the format for a track corresponding to a signal applied to the synchronization mark detecting circuit 611; 702, the output waveform of a synchronization mark detecting circuit 611; and 703 through 710, the output waveforms of the one-shot multivibrators 621 through 628. Reference character S' in the format diagram 701 designates an erroneous synchronization signal. Reference character X in the signal waveforms 702 and 703 designates parts where a synchronization signal is not detected because of the erroneous synchronization signal. This also applies to the signals 704 through 710. Formats for the remaining tracks are not shown, for simplification in illustration.

Now, the operation will be described with reference to FIG. 9. In the case when only playback is effected, the synchronization mark detecting circuits 611 through 618 provide detection outputs in the form of pulse outputs, after detecting the last part of the synchronization marks S of the respective tracks, as shown in FIG. 9. In response to the pulse outputs, the one-shot multivibrators 621 through 628 continuously output the signals "0" for a period of time which is half of the period of the synchronization mark S. When a synchronization mark S is not detected, the one-shot multivibrator is not operated. Therefore, the signal waveforms 702 and 703 corresponding to the format 701 are as shown in parts (b) and (c) of FIG. 9. The signal waveforms 704 through 710 corresponding to the other tracks are as indicated in parts (d) through (j) of FIG. 9, respectively, and where no synchronization mark S can be detected, these signals remain at the logical level "1". However, since the outputs of the one-shot multivibrators 621 through 628 are ANDed by the AND gate 603, even if no synchronization mark S can be detected from a given track, a synchronization mark S can be detected from another track. As a result, the output of the AND gate 603 is a square waveform the level of which is inverted regularly with a predetermined period as illustrated in FIG. 9(k).

Figures 10A, 10B:
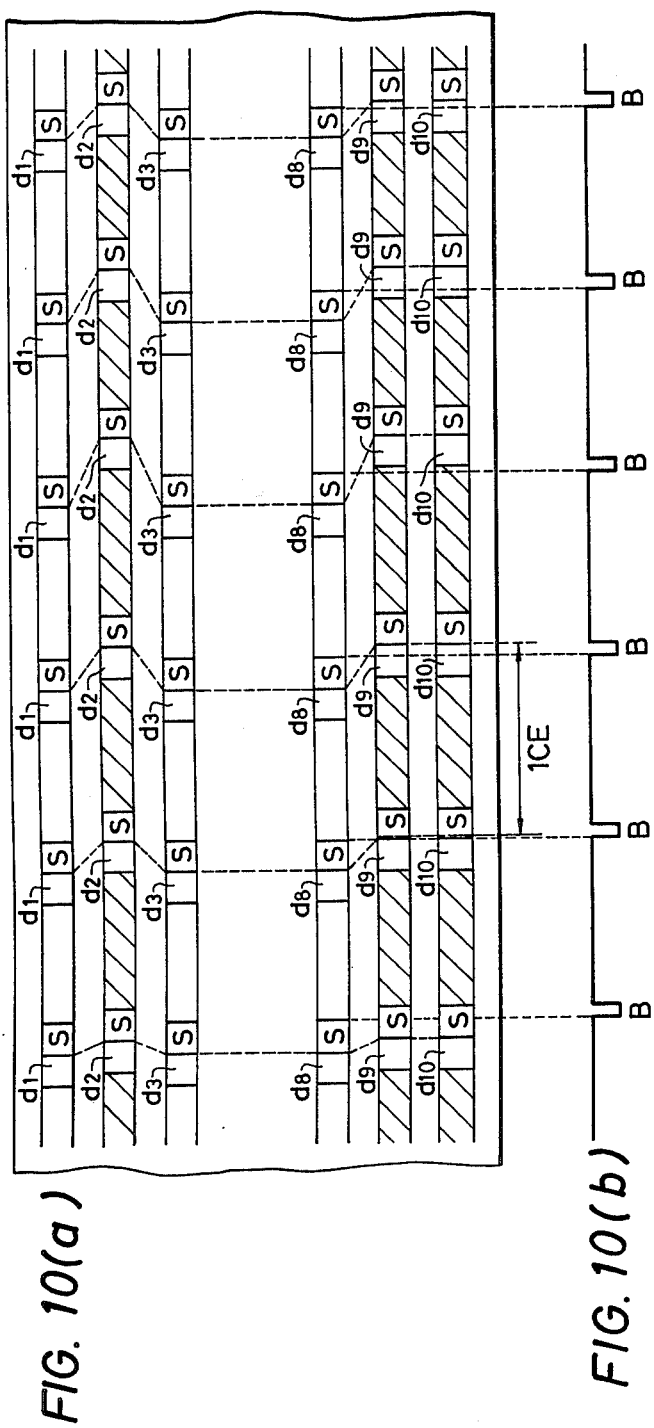
FIGS. 10(a) and 10(b) are explanatory diagrams of tracks subjected to recording by the over-dubbing operation in the above-described embodiment, and the reference reproduction phase.

The operation of the circuitry in over-dubbing will now be described. In this embodiment, the delay time of the delay circuit 105 in the conventional circuit, in which the sum of the delay time of the signal to be recorded and the time required for processing the signal was made equal to the tape running time, is set slightly longer as indicated by expression (1). Therefore, in over-dubbing, the positions of all the synchronization marks S on the record tracks come after the positions of the synchronization marks S on the playback tracks. Therefore the reference playback phase (i.e., reference reproduction phase) in this case is as shown in part (b) of FIG. 10, which is equivalent to that obtained from only the synchronization marks of the playback tracks. Accordingly, even if over-dubbing is repeatedly carried out, a reference playback phase can be obtained, which is free from the effect of over-dubbing. Thus, a stable servo system is provided, and the code blocks can be positively reconstructed.

In the above-described embodiment, recording is effected with the signal record position of a track subjected to over-dubbing lagging the playback signal position of a track subjected to recording. However, the same effect can be obtained by effecting recording with the signal record position of the track subjected to over-dubbing leading the playback signal position of the track subjected to recording.

As is apparent from the above description, with the PCM recording and reproducing device according to the embodiment of the invention, the synchronization marks are detected from a plurality of tracks, and the reference phase is reproduced from the detection signals. Accordingly, even if the synchronization mark cannot be detected from a given track, a correct reference reproduction phase can nonetheless be obtained.

In the above-described embodiment, the one-shot multivibrators 621 to 628 are employed to provide the reference reproduction phase by the utilization of the outputs of the synchronization mark detecting circuit; however, circuits other than one-shot multivibrators may be employed instead, as long as they have a function similar to that of the one-shot multivibrators.

Furthermore, in the above-described embodiment, the synchronization marks are detected from all of the tracks; however, any plural number of tracks may be selected for detection of the synchronization marks. For instance, the synchronization marks may be detected from half of all the available tracks.

The number of tracks on the magnetic tape is not always limited to ten; that is, the number of channels is not always equal to the number of tracks.

As is apparent from the above description, according to the invention, the reference phase for running the magnetic tape is reproduced by the use of a plurality of outputs of the synchronization mark detecting circuits provided for the tracks. Therefore, even if a synchronization mark is erroneous, the reference reproduction phase can still be correctly obtained.

As is apparent from the above description, according to the invention, the reference phase for running a magnetic tape is reproduced using a plurality of outputs of synchronization mark detecting circuits provided for the tracks, and in over-dubbing, signals are recorded after being delayed for a predetermined period of time. Accordingly, even when the synchronization marks become erroneous or when position shifts take place between the tracks because of repeated over-dubbing, the data may nonetheless be reproduced with high accuracy.

What is claimed is:

1. A PCM recording and reproducing device for recording audio signals of a single or plural channels on a plurality of tape tracks after converting the audio signals into digital signals, said device forming frames by periodically adding a synchronization mark for data synchronization in reproduction of the digital signals recorded on the tape tracks, said device including motor means for driving a tape and comprising:
   a plurality of synchronization mark detecting circuits for detecting synchronization marks on the tape tracks;
   a reference phase reproduction circuit, operatively connected to said synchronization mark detecting circuits, for providing a reference reproduction phase for a tape running operation based on at least one of the synchronization marks detected by said synchronization mark detecting circuits on at least one of the tape tracks; and
   a phase comparator, operatively connected to said reference phase reproduction circuit, for comparing the reference reproduction phase with a reference phase, and for providing an output to the motor means.

2. A PCM recording and reproducing device for recording audio signals of a single or plural channels on a plurality of tape tracks after converting the audio signals into digital signals, said device forming frames by periodically adding a synchronization mark for data synchronization in reproduction of the digital signals recorded on the tape tracks, said device including motor means for driving a tape and comprising:
   a plurality of synchronization mark detecting circuits for detecting synchronization marks on the tape tracks;
   a reference phase reproduction circuit, operatively connected to said synchronization mark detecting circuits, for providing a reference reproduction phase for a tape running operation based on at least one of the synchronization marks detected by said synchronization mark detecting circuits on at least one of the tape tracks;
   a phase comparator, operatively connected to said reference phase reproduction circuit, for comparing the reference reproduction phase with a reference phase, and for providing an output to the motor means; and
   delay circuit means for delaying a signal to be recorded on one of the tape tracks for a predetermined period of time when recording and reproduction are carried out simultaneously, so that the signal is recorded at a position which lags or leads the position of a corresponding signal which is reproduced from another of the tape tracks.

3. A device as claimed in claim 1 or 2, wherein the motor means comprises a capstan motor for driving the tape.

4. A device as claimed in claim 1 or 2, further comprising clock generator means for providing the reference phase to said phase comparator.

5. A device as claimed in claim 1 or 2, wherein one of said synchronization mark detecting circuits is provided for each of the tape tracks.

6. A device as claimed in claim 1 or 2, wherein said reference phase reproduction circuit comprises:
   a plurality of means for providing a first output when a corresponding one of said synchronization mark detecting circuits detects a synchronization mark on a corresponding one of the tape tracks; and
   AND circuit means for receiving the first outputs of said plurality of providing means.

7. A device as claimed in claim 6, wherein said plurality of providing means comprise one-shot multivibrators.

8. A device as claimed in claim 7, wherein said plurality of providing means provide the first output for a time period which is substantially half of a repetition period of one of the synchronization marks, and provide a second output until a further synchronization mark is detected.

9. A device as claimed in claim 2, wherein said predetermined period of time ($T_d$) satisfies the following expression:

$$T_d = T_1 - T_p \pm \Delta T_1$$

where $T_1$ is the average value of the time required for the tape to run from a playback head to a recording head, $T_p$ is the signal processing time between the playback head and the recording head, and $\Delta T_1$ is a predetermined time which is longer than the maximum or effective value of the variation in the tape running time.

10. A tape recording and reproducing device for recording audio signals after converting the audio signals into digital signals and for reproducing the audio signals based on the digital signals, comprising:
   means for forming the digital signals into frames by periodically adding a synchronization mark to the digital signals for data synchronization;
   means for reading a tape having the digital signals and the synchronization marks recorded thereon in a plurality of tape tracks;
   synchronization mark detecting circuits, operatively connected to said reading means, for detecting the synchronization marks on at least two of the tape tracks;
   a reference phase reproduction circuit, operatively connected to said synchronization mark detecting circuits, for generating a reference reproduction phase when any one of said synchronization mark detecting circuits detects a synchronization mark;
   a phase comparator, operatively connected to said reference phase reproduction circuit, for comparing the reference reproduction phase with a reference phase and for generating a phase output signal; and
   a motor, operatively connected to said phase comparator, for driving the tape in dependence upon the phase output signal.

11. A tape recording and reproducing device as claimed in claim 10, further comprising delay means for delaying a signal to be recorded on one of the tape tracks for a predetermined period of time when over-dubbing is to take place, so that the signal is recorded at a position which lags or leads the position of a corresponding signal which is reproduced from another of the tape tracks.

12. A device as claimed in claim 11, wherein said reference phase reproduction circuit comprises:
a plurality of one-shot multivibrators, respectively, operatively connected to said synchronization mark detecting circuits, each of said one-shot multivibrators generating a detection signal when the corresponding one of said synchronization mark detecting circuits detects a synchronization mark on a corresponding one of the tape tracks; and
an AND circuit, operatively connected to said one-shot multivibrators, for receiving the detection signals output by said one-shot multivibrators and for generating the reference reproduction phase when at least one of said one-shot multivibrators generates the detection signal output.

* * * * *